US010997687B1

(12) United States Patent
Guerra et al.

(10) Patent No.: US 10,997,687 B1
(45) Date of Patent: May 4, 2021

(54) SYSTEMS AND METHODS FOR PROVIDING UNIVERSAL SUPPORT FOR MULTIPLE TYPES OF GRAPHICS PROCESSING UNITS

(71) Applicant: DELL PRODUCTS L.P., Round Rock, TX (US)

(72) Inventors: Ivan Guerra, Round Rock, TX (US); Meng-Feng Hung, Taoyuan (TW); Yi-Fan Wang, Taipei (TW); Yo-Huang Chang, Taipei (TW); Chih-Chao Ting, New Taipei (TW); Che-Yuan Chang, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/687,232

(22) Filed: Nov. 18, 2019

(51) Int. Cl.
*G06T 1/20* (2006.01)

(52) U.S. Cl.
CPC .................................... *G06T 1/20* (2013.01)

(58) Field of Classification Search
CPC ................................ G06T 1/60; G09G 5/363
USPC ........................................................ 345/502
See application file for complete search history.

(56) References Cited

U.S. PATENT DOCUMENTS 7,561,163 B1 * 7/2009 Johnson ........... G06F 15/17337 345/502
9,372,521 B2 6/2016 Sultenfuss et al.
9,558,527 B2 1/2017 Sierra et al.
10,019,778 B2 7/2018 Sierra et al.
2014/0132612 A1 * 5/2014 Schulze ................ G09G 5/363 345/505
2015/0042664 A1 * 2/2015 Currid ...................... G06F 9/46 345/502
2017/0103037 A1 * 4/2017 Lee .................... G06F 13/3625

OTHER PUBLICATIONS

Wikipedia, "AMD Hybrid Graphics", Printed from Internet Sep. 29, 2019, 4 pgs.
Monitor Insider, "Anatomy of a Monitor", 2017, 8 pgs.
(Continued)

*Primary Examiner* — Jacinta M Crawford
(74) *Attorney, Agent, or Firm* — Egan, Enders & Huston LLP.

(57) ABSTRACT

Systems and methods are provided that may be implemented to enable the same internal display panel assembly (e.g., HDR display panel assembly) of an information handling system to support proper operation with image data provided from different types of graphics processing units (GPUs). A single configuration or type of the internal display panel assembly may be provided within the system to support graphics from one or more GPUs from multiple different graphics suppliers, and one or more programmable integrated circuits of the system may be configured to communicate information or signal/s to a timing controller (TCON) of the internal display panel assembly that corresponds to a proper DPCD profile or interface specification selection for use with a currently-selected GPU of the system. The TCON of the internal panel assembly may be configured to respond to this communicated information or signal/s by selecting and loading a proper DPCD profile or interface definition that corresponds to the currently-selected GPU of the system.

21 Claims, 5 Drawing Sheets

(56) References Cited

OTHER PUBLICATIONS

Dell, “Dell Expands UltraSharp Monitor Family With Innovations and Workforce Transformation in Mind”, Oct. 15, 2018, 5 pgs.
Wiley, “eDP:A Better Embedded Display Ecosystem”, Embedded.com, May 2016, 3 pgs.
Larsen, “HDR (High Dynamic Range) on TVs Explained”, Flatpanelshd.com, Jun. 2015, 12 pgs.
Wikipedia, “High-dynamic-range video”, Printed from Internet Nov. 8, 2019, 14 pgs.
Himax Technologies, “Timing Controllers”, Printed from Internet Sep. 29, 2019, 2 pgs.
“What is HDR Tv, and Why Does It Matter?”, tomsguide.com, Printed from Internet Nov. 8, 2019, 8 pgs.

* cited by examiner

SYSTEMS AND METHODS FOR PROVIDING UNIVERSAL SUPPORT FOR MULTIPLE TYPES OF GRAPHICS PROCESSING UNITS

FIELD OF THE INVENTION

This application relates to graphics and, more particularly, to graphics processing units and video display panels for information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers are often provided with one or two internal graphics processing units (GPUs) in the form of an integrated GPU (iGPU), and a discrete GPU (dGPU). The iGPU is integrated within the host central processing unit (CPU) inside the notebook computer chassis enclosure, and the internal discrete GPU is provided inside the enclosure of a notebook computer chassis and coupled to the host CPU using an internal data bus. The internal discrete GPU provides higher performance as needed, such as computation for 3-D computer game play.

Notebook computers may be provided with an internal (integrated) high dynamic range (HDR) display panel assembly having a HDR display panel. HDR refers to video displayed with a greater dynamic range than standard dynamic range (SDR) video, and includes video displayed according to the VESA certified DisplayHDR™ standard. The HDR display panel assembly includes an internal HDR panel timing controller (TCON) that communicates with a GPU by a DP Aux interface to communicate HDR capabilities. A panel TCON operates to receive image data, convert the format for input to the source drivers, and generates controlling signals for gate and source drivers. Display port configuration data (DPCD) registers have been defined by graphics suppliers to read HDR display panel capabilities. However, the definition of the DPCD registers varies for brightness control and color processing between different GPU suppliers (e.g., such as Nvidia, Intel and AMD Radeon). Conventional internal HDR panel TCONs currently support a single defined DPCD interface in TCON. Connecting an internal HDR display panel assembly to a GPU having a different defined DPCD interface causes abnormal display or distorted images on the internal HDR panel due to the DPCD definition of the HDR interface is different.

"Switchable Graphics" or "Hybrid Graphics" is a multi GPU technology that dynamically selects between the integrated iGPU and the discrete dGPU of a notebook computer based on the graphics processing power required by an application that is currently executing on the information handling system. The intent of hybrid graphics is for a system to transition workloads between iGPU and dGPU for best performance and best for longer battery time. However, some notebook computer system designs have the capability of disabling Hybrid Graphics and the internal display will switch to the dGPU, in which case the HDR DPCD definition required by the dGPU will be different than the iGPU and cannot currently support HDR.

SUMMARY OF THE INVENTION

Systems and methods are disclosed herein that may be implemented in one embodiment to enable the same internal display panel assembly of an information handling system (e.g., mobile information handling system such as notebook computer) to support proper operation with image data provided from different types of graphics processing units (GPUs), including iGPUs and dGPUs having different respective defined timing controller (TCON) DPCD register profiles. Using the disclosed systems and methods, a single configuration or type of internal display panel assembly (e.g., a high-dynamic range video display panel assembly) may be provided within a mobile information handling system that supports both integrated (iGPU) graphics of a host CPU as well as discrete dGPU graphics from multiple different graphics suppliers.

In one embodiment, universal support for multiple different GPU types and suppliers/manufacturers may be provided to allow graphics data input from multiple different types of GPUs (both iGPUs and dGPUs) to be used to drive a common type of internal display panel assembly. In one embodiment, this universal support may be implemented with an information handling system that has a single GPU (e.g., either an iGPU or a dGPU). In another exemplary embodiment, this universal support may be implemented with an information handling system that has multiple GPUs (e.g., both iGPU and dGPU) to allow graphics data input to the same system internal display panel assembly to be successfully switched manually (e.g., by a human user) or automatically (e.g., by logic executing on a programmable integrated circuit) between the different system GPUs.

In one embodiment, by providing a mobile information handling system having a single high dynamic range (HDR) display panel assembly that supports different GPUs from multiple graphics suppliers, HDR display panel assembly complexity may be advantageously reduced and management of only a single display panel assembly part number and a single HDR display panel assembly inventory may be made possible during mobile system manufacture, i.e., to enable different GPUs to produce undistorted images on a HDR display panel of a given HDR display panel assembly without requiring a different dedicated HDR display panel assembly to be utilized for each different GPU supplier, different manufacturer and/or different GPU type. Although described herein in relation to exemplary HDR panel assemblies, it will be understood that the disclosed systems and methods may also be implemented with any other type of display panel assembly that includes a TCON that communicates with one or more GPUs using a DPCD interface to communicate dynamic range and display capabilities (e.g., such as luminance, brightness, gamut, tone, etc.).

In the practice of the disclosed systems and methods, one or more programmable integrated circuits of a mobile information handling system may be configured to communicate information or signal/s corresponding to the proper DPCD profile or interface specification selection for use with different GPUs (iGPU and/or dGPU) of the mobile information handling system to a TCON of an internal (e.g., integrated) display panel assembly of the mobile information handling system, and the TCON of the internal display panel assembly may be configured to respond to this communicated information or signal/s by selecting and loading a proper DPCD profile or interface definition that corresponds to each of the different GPUs (e.g., iGPU and/or dGPUs) of the mobile information handling system.

In one exemplary embodiment, GPUs (e.g., iGPU and/or dGPU) of a mobile information handling system may be configured to transmit graphics identification information (GII) (e.g., such as an IEEE Organizationally Unique Identifier "OUI") that identifies or otherwise distinguishes its graphics manufacturer or supplier (e.g., Nvidia, AMD, etc.) and/or GPU type (e.g., NVidia Quadro, NVidia GeForce, AMD Radeon, AMD RX, etc.) to a TCON of an internal display panel assembly of the mobile information handling system. This identification information may be stored, for example, in non-volatile memory (NVM) memory of the GPU such as during fabrication or assembly of the GPU. The TCON of the internal HDR display panel assembly may respond to this transmitted identification information by selecting and loading a specific DPCD profile that corresponds to the transmitted GII.

For example, multiple DPCD profiles for different graphics suppliers and/or types of different GPUs may be stored in advance (e.g., as a lookup table) on NVM of the HDR display panel assembly. Upon receipt of the transmitted GII (e.g., IEEE OUI) from the GPU that corresponds to a type and/or supplier of a specific GPU, the TCON may select and load the DPCD profile from the HDR display panel assembly NVM that matches or otherwise corresponds to the GPU of the mobile information handling system. In one exemplary embodiment, an GPU may be programmed to transmit its GII to the HDR TCON whenever a different system GPU is selected, e.g., where a human user enables or disables "Hybrid Graphics" or "Switchable Graphics" the resulting active GPU will communicate its GII to the panel TCON which will respond by loading the proper DPCD profile for the active GPU.

In another embodiment, a system basic input/output system (BIOS)/Embedded Controller (EC) of a mobile information handling system may be configured to manage and control DPCD profile setting selection made by an internal HDR display panel assembly of the mobile information handling system based on a BIOS setting (e.g., such as "Hybrid Graphics" or "Switchable Graphics" ON or OFF) or other input made to BIOS settings. For example, a system BIOS component (e.g., executing on the embedded controller "EC") may be configured to toggle the bit of one more general purpose input/output (GPIO) connectors that are electrically coupled between the EC and the HDR display panel assembly TCON to provide a signal to indicate to the TCON the identity (e.g., supplier, manufacturer, and/or type) of the system GPUs or to explicitly indicate which DPCD profile should be loaded to match a corresponding system GPU selection indicated by the BIOS settings (e.g., either selected by a human user or selected based on currently-selected "Hybrid Graphics" or "Switchable Graphics" state or other GPU identity indication). This selection may be made, for example, in the system BIOS to correspond to the identity of the graphics supplier for the current GPU that is selected by a user during system boot and/or system BIOS setup, or may be selected to correspond to the current state of "Hybrid Graphics" or "Switchable Graphics" mode which automatically selects the iGPU and/or dGPU (e.g., on the fly during normal operating system runtime) based on an application whitelist. Upon receipt of the signal that specifies the system GPU identity and/or selected DPCD, the TCON may retrieve the payload of the corresponding indicated DPCD profile from the NVM of the HDR display panel assembly based on this signal for use with the GPUs of the mobile information handling system.

Advantageously, the disclosed systems and methods may be implemented to switch graphics data input for an internal HDR panel display back and forth between integrated (e.g., host CPU) graphics to graphics data input provided by a separate GPU that is identified to a TCON of the HDR display panel assembly by the GII or identified or otherwise selected by a signal transmission (such as GPIO signal/s described above). Such a capability may be utilized in one embodiment to enable switching to and from display of GPU graphics data on a HDR display panel in response to a human user selection between an integrated iGPU and a discrete dGPU of the same information handling system, e.g., according to a "Hybrid Graphics" or "Switchable Graphics" human user selection. In another embodiment, capabilities of the disclosed systems and methods may be employed to enable "Hybrid Graphics" or "Switchable Graphics" switching between display of iGPU graphics data and/or dGPU graphics data on a HDR display panel as needed to display graphics data processed by one of a system iGPU, a system dGPU or a dual graphics mode in which both system iGPU and system dGPU work together at the same time to co-process graphics data for display on the HDR display panel.

In one respect, disclosed herein is a method, comprising: communicating information or signal/s to a timing controller (TCON) of a display panel assembly of an information handling system, the information or signal/s indicating display port configuration data (DPCD) register values for use with a currently-selected graphics processing unit (GPU) of the information handling system; responding to receipt of the information or signal/s in the TCON by selecting the indicated DPCD register values from multiple different DPCD register values stored on non-volatile memory (NVM) of the TCON; loading the selected DPCD register values from the non-volatile memory of the TCON into volatile memory of the TCON; and using the loaded DPCD register values to control display of graphics from data provided by the currently-selected GPU of the information handling system on a display panel of the display panel assembly.

In another respect, disclosed herein is an information handling system, comprising: a display panel assembly comprising a display panel and a timing controller (TCON) comprising a first programmable integrated circuit that is coupled to control display of graphics on the display panel; a graphics processing unit (GPU) coupled to provide graphics to the display panel assembly; and at least one second programmable integrated circuit of the information handling system programmed to communicate information or signal/s to the TCON indicating display port configuration data (DPCD) register values for use with the GPU when it is currently selected to perform system graphics processing for driving the display panel of the display panel assembly of the information handling system. The first programmable integrated circuit of the TCON may be programmed to respond to receipt of the information or signal/s by: selecting the indicated DPCD register values from multiple different DPCD register values stored on non-volatile memory (NVM) of the TCON, loading the selected DPCD register values from the non-volatile memory of the TCON into volatile memory of the TCON, and using the loaded DPCD register values to control display of graphics from data provided by the currently-selected GPU of the information handling system on the display panel of the display panel assembly.

DESCRIPTION OF ILLUSTRATIVE EMBODIMENTS

Figure 1:
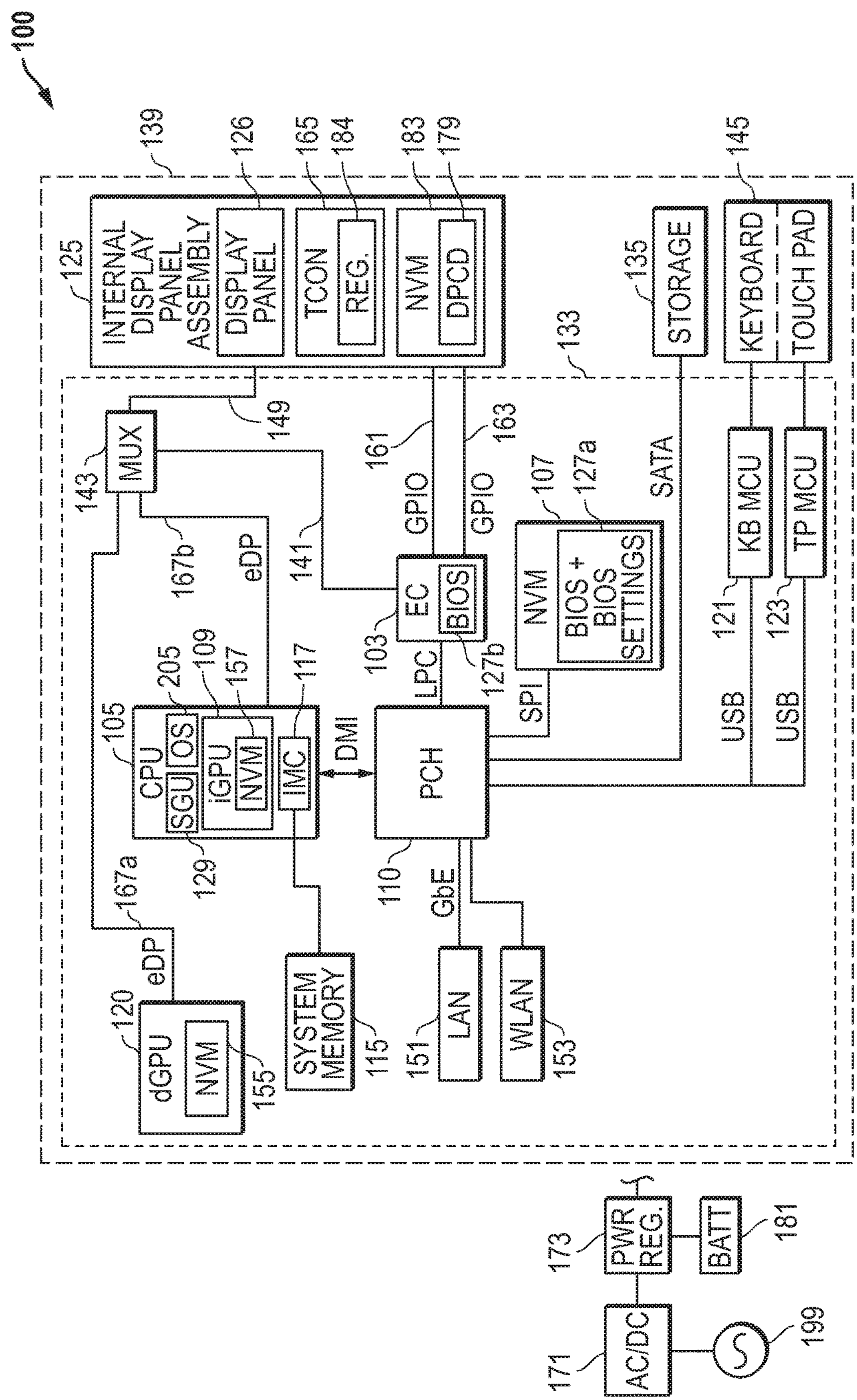
FIG. 1 illustrates a block diagram of a mobile information handling system according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a mobile information handling system such as a notebook computer, laptop computer, or tablet computer having a chassis enclosure 139 delineated by the outer dashed outline. As shown in FIG. 1, information handling system 100 of this exemplary embodiment includes various components that are embedded on a system motherboard 133 contained within the chassis enclosure 139 which may be, for example, a plastic and/or metal case (e.g., notebook computer case, tablet computer case, smartphone case, etc.). However, it will be understood that any one or more of such embedded components may be alternatively provided separate from motherboard 133 within chassis enclosure 139 of information handling system 100, e.g., such as provided on a daughter card or other separate mounting configuration.

Still referring to FIG. 1, information handling system includes a host processing device 105 which may be a central processing unit CPU such as an Intel processor, Advanced Micro Devices (AMD) processor, or one of many other suitable processing devices currently available. In this embodiment, a host processing device in the form of CPU 105 may execute a host operating system (OS) 205 for system 100. System memory may include main system memory 115 (e.g., volatile random access memory such as DRAM or other suitable form of random access memory) coupled (e.g., via DDR channel) to an integrated memory controller (iMC) 117 of CPU 105 to facilitate memory functions, although it will be understood that a memory controller may be alternatively provided as a separate chip or other circuit in other embodiments.

As shown in FIG. 1, CPU 105 itself includes an integrated GPU (iGPU) 109 and information handling system 100 also includes a separate internal discrete GPU (dGPU) 120 that may be powered by a power source of information handling system (e.g., such as AC adapter 171 and/or internal smart battery pack 181) using internal integrated power supply circuitry and/or internal voltage regulation circuitry 173 of information handling system 100. In one mode of operation, video content from CPU 105 may be sourced at any given time either by iGPU 109 or dGPU 120, and is switchable "on the fly" from one to the other using drivers of a switchable graphics software utility (SGU) 129 (e.g., NVidia Optimus available from NVidia of Santa Clara, Calif.; AMD Power Express available from Advanced Micro Devices Inc. of Sunnyvale, Calif.) that may be executing on CPU 105 and that is typically (but not necessarily) provided by a supplier of the given dGPU 120 that is presently installed in information handling system 100.

As shown in FIG. 1, dGPU 120 of FIG. 1 may be, for example, a graphics card that is coupled to CPU 105 of information handling system 100 by a multi-channel embedded display port (eDP) bus 167*a*, and CPU 105 with its iGPU 109 is in turn coupled to internal HDR display panel assembly 125 and its display panel 126 by eDP bus 167*b*. A multiplexer (MUX) 143 is present to select between iGPU 109 and dGPU 120 as the source of graphics data input 149 to internal display panel assembly 125. In this embodiment, a control pin 141 provides a signal from embedded controller (EC) 103 to control the selection of MUX 143. For example, during system boot up, a graphics setting (e.g., "Hybrid Graphics" or "Switchable Graphics" ON or OFF) of system BIOS 127*a* may be used by EC 103 to use signal on control pin 141 to program or otherwise control the setting of MUX 143 to select between eDP bus 167*a* of dGPU 120 and eDP bus 167*b* of iGPU 109 as the current source of graphics data input 149 to internal display panel assembly 125.

It will be understood that in other embodiments, an information handling system may alternatively include only a single GPU (e.g., iGPU or dGPU) coupled to source graphics data to an internal HDR display panel assembly, or may include more than two GPUs (e.g., multiple dGPUs, single iGPU and multiple dGPUs, multiple iGPUs and single dGPU, multiple iGPUs, etc.) couple to source data to an internal HDR display panel assembly.

In one embodiment, HDR display panel assembly 125 may be configured to operate according to a VESA Certified DisplayHDR standard (e.g., such as DisplayHDR 400, Display HDR 500, Display HDR 600, etc.), although HDR display panel assembly 125 may alternately configured to operate according to other types of HDR standards including, but not limited to, HDR10 Media Profile, HDR10+, Dolby Vision, Hybrid Log-Gamma, SL-HDR1, etc. In one embodiment, display panel assembly 125 and its display panel 126 may be configured to display a horizontal display resolution of 4K (e.g., 3840×2160) or greater, although horizontal display resolutions less than 4K are also possible. Further, it will be understood that the disclosed systems and methods may also be implemented with any other type of display panel assembly (e.g., having other dynamic range, horizontal display resolution, etc.) that includes a TCON that communicates with one or more GPUs using a DPCD interface to communicate dynamic range and display capabilities (e.g., such as luminance, brightness, gamut, tone, etc.).

As shown in FIG. 1, dGPU 120 includes non-volatile memory (NVM) 155 that is present to store operating parameters and other information such as IEEE OUI or other graphics identification information (GII) for the current specific dGPU 120, and iGPU 109 includes non-volatile memory (NVM) 157 that is present to store operating parameters and other information such as IEEE OUI or other GII for the current specific iGPU 109. In this regard, GII may identify the manufacturer or supplier, manufacturer, and/or type of iGPU 109 or dGPU 120 as described elsewhere herein. Examples of different GPU (iGPU and/or dGPU) manufactures and suppliers include, but are not limited to, Intel, NVidia, AMD, etc. Examples of different types of dGPUs include, but are not limited to, NVidia Quadro, NVidia GeForce, AMD Radeon, AMD RX, etc.

It will be understood that eDP is just one example of a suitable type of data bus interface that may be employed to route graphics data between internal components of information handling system 100, and that any other suitable type of data bus/es may be employed. Other examples of possible dGPU and iGPU configurations and system architectures may be found described and illustrated in U.S. Patent Number 9,558,527, which is incorporated herein by reference in its entirety for all purposes.

As further illustrated in FIG. 1, CPU 105 may be coupled to embedded platform controller hub (PCH) 110 (e.g., by direct media interface "DMI") which may be present to facilitate input/output functions for the CPU 105 with various internal components of information handling system 100. In this exemplary embodiment, PCH 110 is shown coupled to other embedded components on a motherboard 133 that include system embedded controller (EC) 103 (e.g., coupled via low pin count "LPC" connection), non-volatile memory 107 (e.g., SPI Flash memory device), wireless network card (WLAN) 153 for Wi-Fi or other wireless network communication, integrated network interface card (LAN) 151 for Ethernet or other wired network connection, touchpad microcontroller (MCU) 123, keyboard microcontroller (MCU) 121, audio codec 113, and audio amplifier 112. Also shown coupled to PCH 110 are other non-embedded internal components of information handling system 100 which include internal HDR display panel assembly 125, internal speaker 119, integrated keyboard and touchpad 145, and local system storage 135, e.g., hard drive or other suitable type of permanent storage media such as solid state drive (SSD), optical drives, NVRAM, Flash or any other suitable form of internal storage. Persistent storage (e.g., non-volatile memory 107) may be accessed as needed by EC 103 and/or CPU 105. Such persistent storage 107 may store or contain firmware or other programming that may be used by EC 103, such as system BIOS code settings 127*a*.

As shown in FIG. 1, an internal HDR display panel assembly 125 includes an integrated timing controller (TCON) 165 that is a programmable integrated circuit (e.g., such as microcontroller) that is programmed to receive image data from iGPU 109 or dGPU 120 when currently selected, convert the format for input to source drivers of internal HDR display panel 126 and generate controlling signals for gate and source drivers of display panel 126. HDR display panel 126 may have a resolution, for example, of 3840 pixels×2160 pixels or greater resolution. In this embodiment, HDR display panel assembly 125 also includes integrated non-volatile memory (NVM) 183 which is present for storing information such as programming, system variables and multiple different DPCD register values 179 for use by TCON 165 during system operation. Also shown are TCON DPCD registers 184 into which DPCD register values 179 are loaded to control how brightness control and color processing is performed by TCON 165.

As further described herein, different and unique DPCD register values 179 may be defined for each different graphics supplier, manufacturer and/or type of iGPU 109 and dGPU 120 (e.g., such as Nvidia, Intel and AMD), and DPCD register values 179 may simultaneously include register values for multiple different graphics suppliers, manufacturers and/or types of iGPU 109 and dGPU 120. Such DPCD register values 179 may be pre-stored onto NVM 183 by the HDR display panel assembly vendor or manufacturer, e.g., in the factory during assembly or manufacture of the HDR display panel assembly 125. Examples of the format of a definition of DPCD register values 179 for one supplier, manufacture or type of an exemplary iGPU 109 or dGPU 120 may be found shown in Table 1 below, it being understood that DPCD register values stored on NVM 183 may contained multiple such tables that include respective DPCD register values for multiple different graphics suppliers, manufacturers and/or types of iGPUs 109 and/or dGPUs 120.

TABLE 1

| Aux Register Offset | Definition | Description |
|---|---|---|
| 004Axh | DPCD_EDPHDR_CAPS | Report TCON capabilities, 2080 decode, 2020 gamut, panel tone mapping |
| 004Bxh | DPCD_EDPHDR_GET-SET_CTRL_PAR_AMS | Decode with 2084, Enable tone mapping |
| 004Cx-0x00xxxh | DPCD_EDPHDR_Panel_Luminance_Override | Override panel luminance from source side |
| 004Dx | DPCD_EDP_SDR_Luminance_Level | SDR Luminance to be used as desired by OS/OEM |
| 004Ex-0x00xxxh | BacklightlevelMillNits | |

In one embodiment, information handling system 100 may be a mobile battery-powered information handling system that may be selectively coupled to an external source of system (DC) power, for example AC mains 199 and an AC adapter 171. Information handling system may also include an internal DC power source (e.g., smart battery pack) that is configured to provide system power source for the system load of information handling system, e.g., when an external source of system power is not available or not desirable. Further information on battery-powered information handling system architecture and components may be found in U.S. Patent Number 9,372,521, which is incorporated herein by reference in its entirety. It will also be understood that the particular configuration of FIG. 1 is exemplary only, and that an information handling system may be configured with fewer, additional or alternative components than those illustrated in FIGS. 1.

Figure 2:
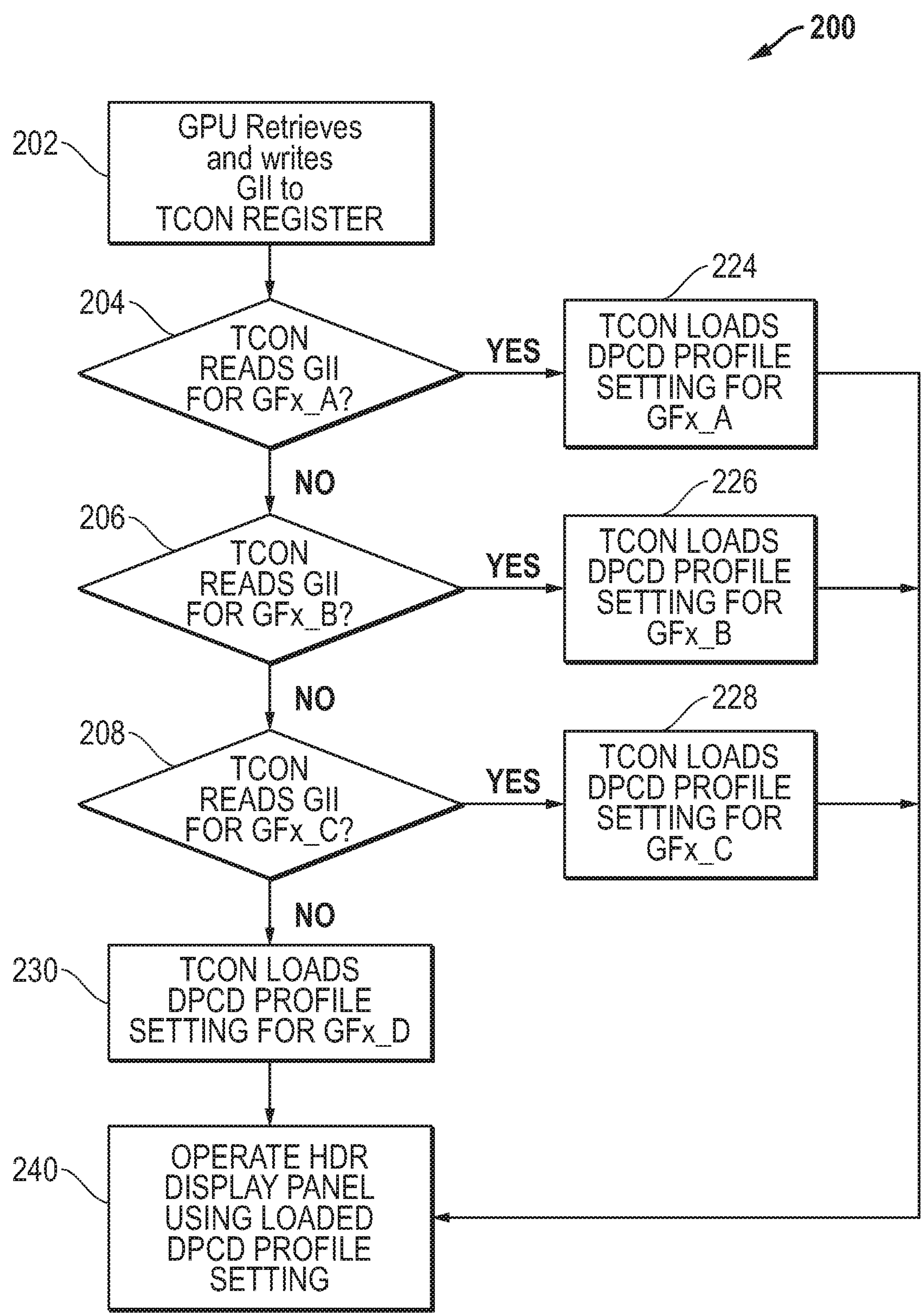
FIG. 2 illustrates methodology according to one exemplary embodiment of the disclosed systems and methods.

FIG. 2 illustrates one exemplary embodiment of methodology 200 that may be employed as needed to communicate graphics identification information (GII) of a currently-selected GPU (e.g., GFx_A, GFx_B, or GFx_C in this embodiment) to integrated TCON 165 of internal HDR display panel assembly 125 of mobile information handling system 100 of FIG. 1. In the embodiments of FIG. 2, each of GPUs GFx_A, GFx_B, GFx_C, and GFx_D may correspond, for example, to an identity of a different type of GPU (e.g., iGPU or dGPU) that may possibly be present and currently-selected for use in a given information handling system, such as system 100. However, it will be understood that all of GPU types GFx_A, GFx_B, GFx_C, and GFx_D need not be, and will likely not be, present in a given system, e.g., such as system 100 which has only one iGPU 109 and one dGPU 120 present.

As shown, methodology 200 starts in step 202 where the currently-selected GPU (GFx_A, GFx_B, or GFx_C as the case may be) retrieves GII (e.g., such as IEEE OUI or any other unique information suitable for identifying a graphics supplier, manufacturer and/or type of the currently-selected GPU) from its internal NVM memory that corresponds to the graphics supplier and/or type of the current selected GPU. The currently-selected GPU writes this GII across auxiliary channel of eDP 167*a* and 167*b* to register 184 of TCON 165. The currently-selected GPU may initiate this data write of step 202 upon, for example, occurrence of system power reboot and/or a switch of Graphics display from a different GPU source (e.g., a different dGPU or iGPU) to the currently-selected GPU.

Next, in one of steps 204, 206, or 208, TCON 165 attempts to read the GII (e.g., IEEE OUI) corresponding to the identity of the currently-selected GPU from register 184 of TCON 165 that has been written in step 202 by the currently-selected GPU to TCON register 184. Based on the identity of the currently-selected GPU (GFx_A, GFx_B, or GFx_C in this embodiment) indicated by the presence of a GII written to TCON register 184, TCON 165 selects the DPCD profile setting including DPCD register values 179 (e.g., such as brightness and color, etc.) from HDR display panel assembly NVM 183 that corresponds to the written GII and identity of the currently-selected GPU (i.e., one of different GPUs GFx_A, GFx_B, or GFx_C). In the case that it is found that no GII data or blank GII data has been written by the currently-selected GPU to register 184 (i.e., the result of step 208 is "No"), then TCON 165 selects the DPCD profile setting including DPCD register values 179 from HDR display panel assembly NVM 183 that corresponds to a fourth and different GPU (i.e., GFx_D) which, for example, may be present in system 100. Then in one of corresponding steps 224, 226, 228, or 230, TCON 165 loads the DPCD register values 179 from the selected DPCD profile setting into TCON DPCD registers 184 for use by TCON 165 (e.g., brightness control, color processing, etc.) during operation of the currently-selected GPU with HDR display panel assembly 125 of system 100 in step 240.

To summarize methodology 200 of the exemplary embodiment of FIG. 2, TCON 165 may be allowed to select and load unique GPU profile settings (including register values 179) corresponding to one of four different types of GPUs (GFx_A, GFx_B, GFx_C, or GFx_D) based on the presence or absence of GII written by the currently-selected GPU into TCON register 184. In the illustrated embodiment, a unique GII (e.g., IEEE OUI) is associated with each of GFx_A, GFx_B and GFx_C, while there is no GII associated with GFx_D. As shown, in steps 204, 206 and/or 208, TCON 165 selects the unique GPU profile settings corresponding to one of respective GPU supplier/manufacturer/types GFx_A, GFx_B and GFx_C when GII corresponding to one of these GPU types is found to have been written to TCON register 184 in step 202 by the currently-selected GPU. Further, in this embodiment, TCON 165 selects unique GPU profile settings corresponding to GFx_D in step 210 if empty GII (no GII data or blank GII data) is written to TCON register 184 by the currently-selected GPU. Following one of steps 204, 206, 208 or 210, TCON 165 then loads the DPCD register values 179 of the selected DPCD profile into TCON DPCD registers 184 in one of corresponding steps 224, 226, 228 or 230.

Methodology 200 then proceeds to step 240 where the currently-selected GPU provides graphics data to TCON 165, and TCON 165 uses the loaded selected and loaded GFx profile settings to control brightness, color processing, etc. when producing corresponding images on HDR display panel 126. It will be understood that the embodiment of FIG. 2 is exemplary only, and that similar methodology may be employed with more or less than four different possible GPU profile settings, and/or without use of an empty GII option.

Figure 3:
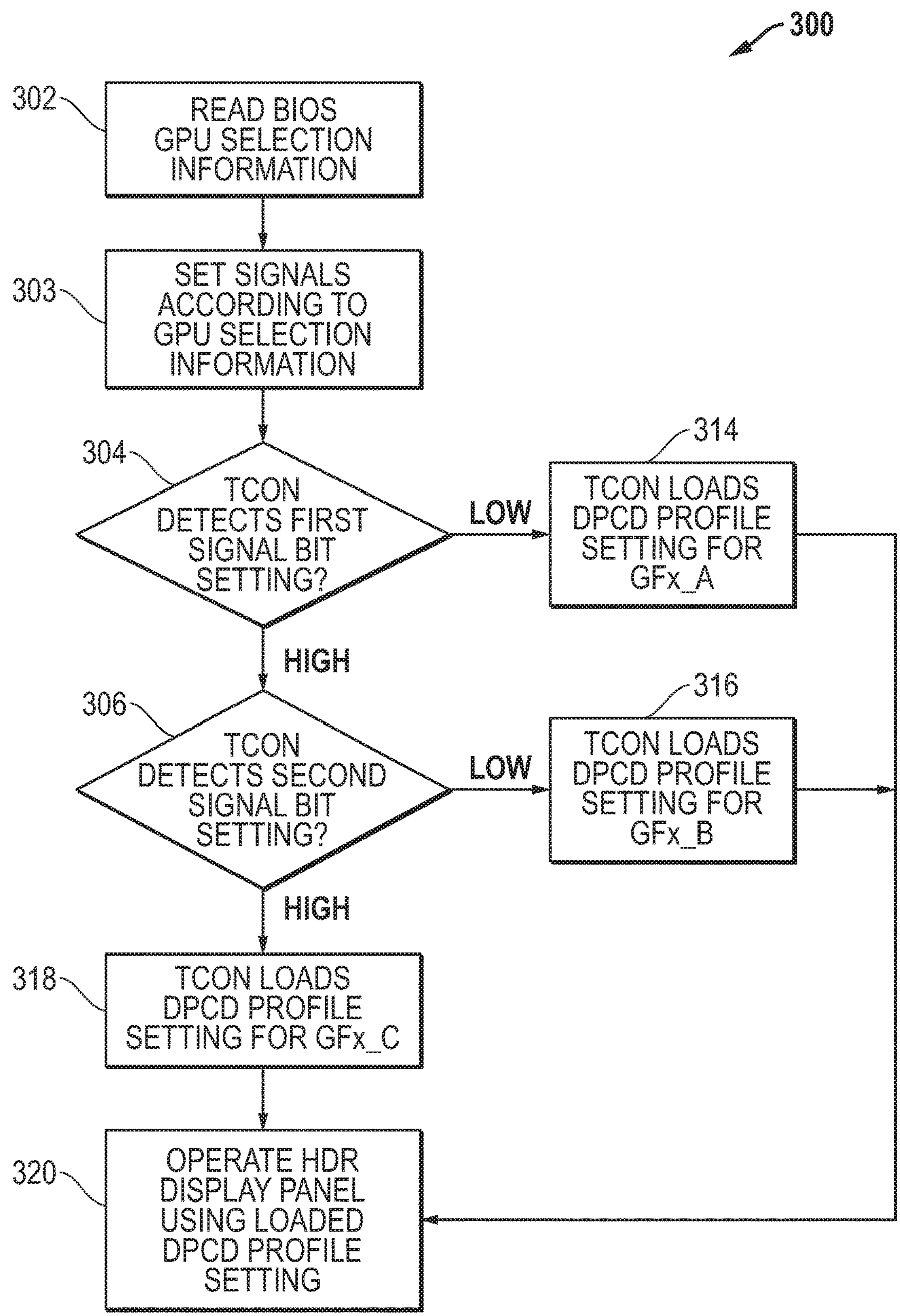
FIG. 3 illustrates methodology according to one exemplary embodiment of the disclosed systems and methods.
Figure 4:
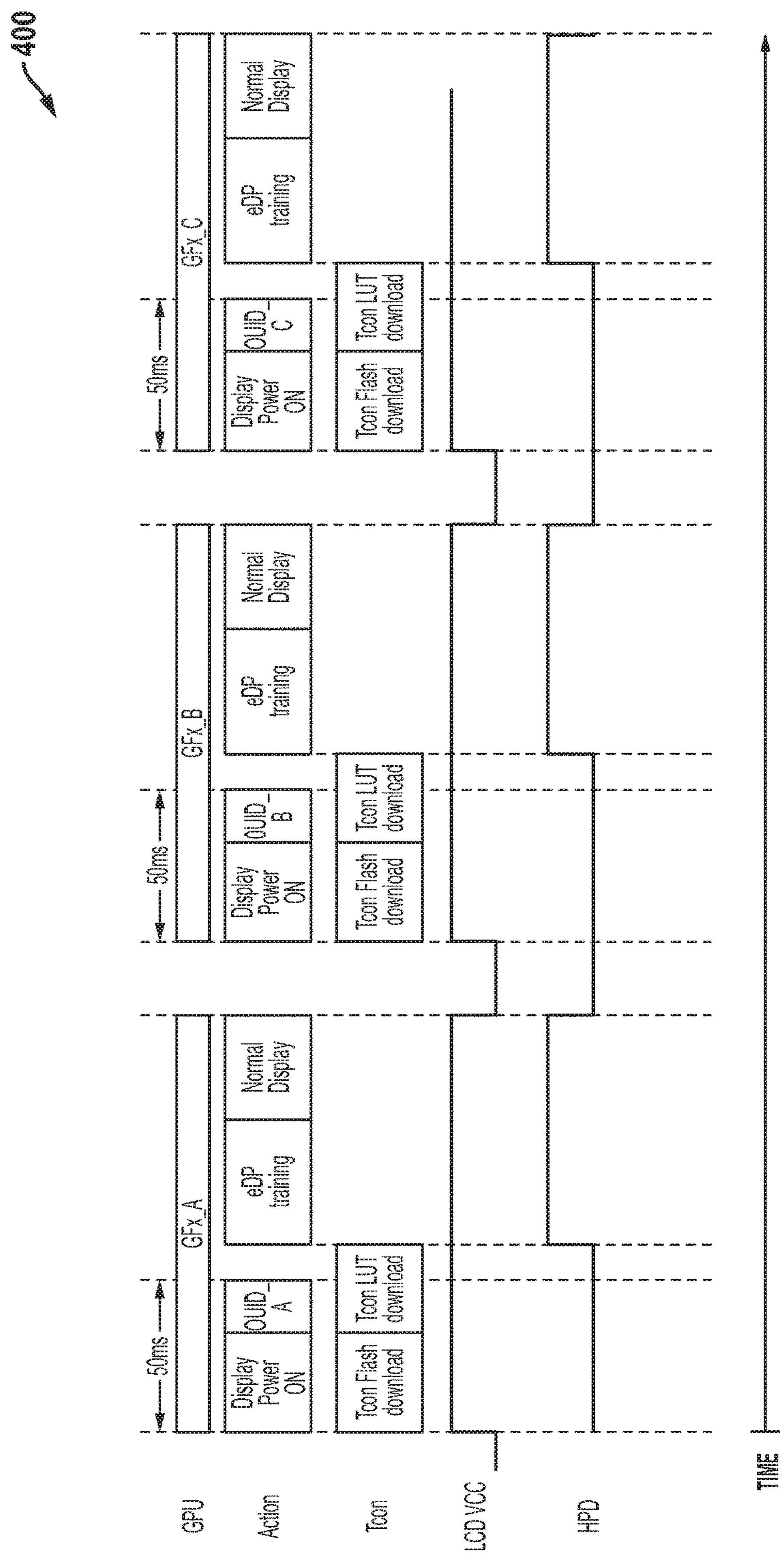
FIG. 4 illustrates a work flow timing diagram according to one exemplary embodiment of the disclosed systems and methods.
Figure 5:
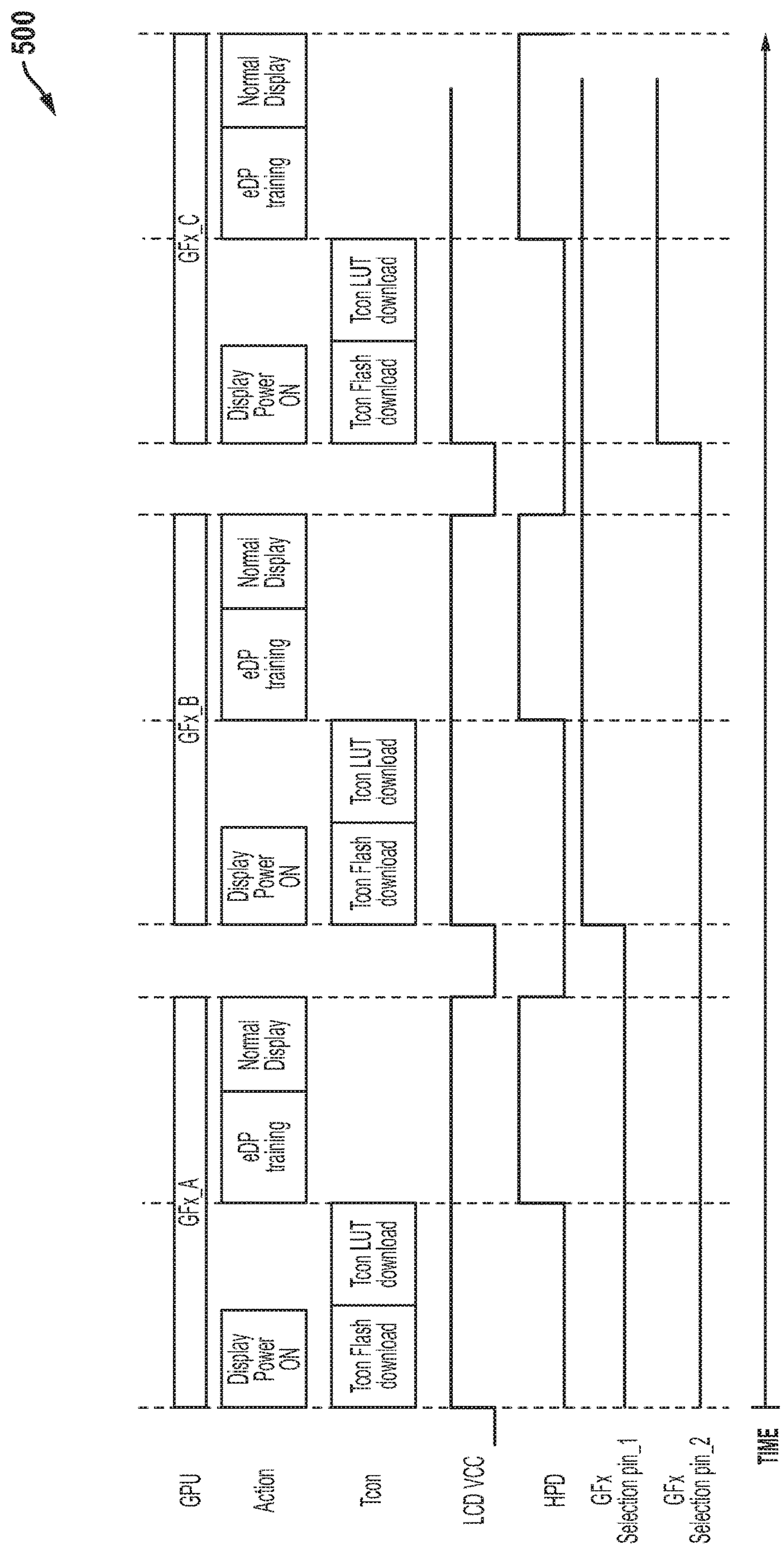
FIG. 5 illustrates a work flow timing diagram according to one exemplary embodiment of the disclosed systems and methods.

FIG. 3 illustrates another exemplary embodiment of a methodology 300 that may be employed to select and load a GPU profile setting (including DPCD register values 179) for a selected manufacturer, supplier and/or type of a given currently-selected GPU based on multiple signals (in this case, two GPIO signal/s on GPIO conductors 161 and 163) communicated from a programmable integrated circuit (e.g., such as EC 103) to integrated TCON 165 of internal HDR display panel assembly 125 of mobile information handling system 100 of FIG. 1. In the embodiments of FIGS. 3-5, each of GPUs GFx_A, GFx_B, and GFx_C may correspond, for example, to an identity of a different type of GPU (e.g., iGPU or dGPU) that may possibly be present and currently-selected for use in a given information handling system, such as system 100. However, it will be understood that all of GPU types GFx_A, GFx_B, and GFx_C need not be, and will likely not be, present in a given system, e.g., such as system 100 which has only one iGPU 109 and one dGPU 120 present.

As shown, methodology 300 starts in step 302 where BIOS programming 127*b* executing on a programmable integrated circuit (e.g., EC 103) reads GPU selection information, e.g., corresponding to a given supplier, manufacturer and/or type of the currently-selected GPU installed within system 100. In one embodiment, this GPU selection information may be entered by a human user (e.g., using "Switchable Graphics"). In another embodiment, this GPU selection information may be entered by a human user into BIOS 127*b* during system boot and/or setup, and/or may be automatically switched by BIOS 127*b* on the fly during system operation (e.g., during normal OS runtime) operation based on real time graphics processing load (e.g., to select or deselect "Hybrid Graphics" mode state).

In step 303 the BIOS programming 127*b* executing on the programmable integrated circuit generates one or more signals (e.g., by setting GPIO pin bits on each of GPIO signal conductors 161 and 163) based on the GPU selection information read in step 302. It will be understood that FIG. 3 is exemplary only, and that similar methodology may be applied using only a single GPIO signal (e.g., to select between two different GPU profile settings), or using three or more GPIO signals (e.g., to select between four or more different GPU profile settings).

Next, in steps 304 and/or 306 of FIG. 3, TCON 165 detects the signals (e.g., GPIO bits sel pin_1 and/or sel pin_2) generated in step 303, and selects and loads unique GPU profile settings (including register values 179) corresponding to one of three different types of GPU (GFx_A, GFx_B, or GFx_C) based on the bit state of GPIO signal conductors 161 and 163. As shown in this example, if the current GPIO signal on GPIO conductor 161 (e.g., corresponding to sel pin_1 on GPIO pin_1) is detected to be low in step 304, then TCON 165 selects and loads a unique GPU profile setting (including register values 179) corresponding to GFx_A in step 314, and then uses the loaded DPCD register values 179 in step 320 (e.g., for brightness control, color processing, etc.) to operate HDR display panel 126 with the currently-selected GPU.

However, if GPIO signal on GPIO conductor 161 is found to be high in step 304, methodology proceeds to step 306 where the bit setting of the current GPIO signal on GPIO conductor 163 (e.g., corresponding to sel pin_2 on GPIO pin_2) is detected to be high or low. If the signal on GPIO conductor 163 is found to be low in step 306, then methodology 300 proceeds to step 316 where TCON 165 selects and loads a unique GPU profile setting (including register values 179) corresponding to GFx_B, and uses these loaded DPCD register values 179 in step 320 to operate HDR display panel 126 with the currently-selected GPU. If the signal on GPIO conductor 163 is found to be high in step 306, then methodology 300 proceeds to step 318 where TCON 165 selects and loads a unique GPU profile setting (including register values 179) corresponding to GFx_C, and uses these loaded DPCD register values 179 in step 320 to operate HDR display panel 126 with the currently-selected GPU. It will be understood that FIG. 3 is exemplary only, and that similar methodology may be applied using different pin setting assignments. For example, a high pin setting may be employed to select and load GFx_A profile setting in step 314, and a high pin setting may be employed to select and load GFx_B in step 316, while a low pin setting may be used to select and load GFx_C profile setting in step 318.

FIG. 4 illustrates a work flow timing diagram corresponding to one exemplary embodiment of methodology 200 of FIG. 2, showing the inter-relation and timing of actions and signals that occur in response to writing of GII (e.g., IEEE OUID) from a currently-selected GPU to TCON 165 to cause selection of DPCD profile settings for each of three different possible GPUs GFx_A, GFx_B and GFx_C that in this embodiment each support an OUID driver. Specifically, actions and signals for the currently-selected GPU and TCON 165 and other components of internal HDR display panel assembly 125 are shown in response to writing of each of the different GIIs OUID_A, OUID_B and OUID_C. Power on timing for panel LCD (Vcc) and hot plug detection ("HPD") are shown relative to TCON operation including TCON Flash download (e.g., operating and configuration parameters for HDR display panel assembly 125) and TCON lookup table ("LUT") download of step 224, 226 or 228 (e.g., LUT including GPU profile setting and DPCD register values for the currently-selected GPU based on reading of the written GII in steps 204, 206, and/or 208), as well as sequential display panel assembly actions of HD panel assembly power on, GII (OUID) transmission, Embedded Display Port (eDP) training, and normal display operation.

In the exemplary embodiment of FIG. 4, each possible GPU type (GFx_A, GFx_B and GFx_C) when selected must send its GII (OUID) to TCON 165 within a time interval of 50 milliseconds (ms) for TCON LUT setup, although this time interval is exemplary only and may be greater or lesser in other embodiments. After TCON LUT setup is complete, eDP link training may be performed as shown. HPD timing may follow Video Electronics Standards Association (VESA) specifications.

FIG. 5 illustrates a work flow timing diagram corresponding to one exemplary embodiment of methodology 300 of FIG. 3, showing the inter-relation and timing of actions and signals that occur in response to signals (in this example GPIO pin selection in the form of bit settings on GPIO conductors 161 and 163) to cause selection of DPCD profile settings for each of three different possible GPUs GFx_A, GFx_B and GFx_C which each may not support an OUID driver. Specifically, actions and signals for the currently-selected GPU and TCON 165 and other components of internal HDR display panel assembly 125 are shown in response to different high versus low bit settings on GPIO conductors 161 and 163. As with FIG. 4, power on timing for panel LCD (Vcc) and HPD are shown relative to TCON operation including TCON Flash download (e.g., operating and configuration parameters for HDR display panel assembly 125) and TCON lookup table "LUT" download of step 314 or 316 (e.g., LUT including GPU profile setting and DPCD register values for the currently-selected GPU based on detection of signal bit settings in steps 304 and 306), as well as sequential display panel assembly actions of HD panel assembly power on, GII (OUID) transmission, Embedded Display Port (eDP) training, and normal display operation.

In the exemplary embodiment of FIG. 5, each possible GPU type (GFx_A, GFx_B and GFx_C) must send its GII to TCON 165 within a time interval of 50 milliseconds (ms) for TCON LUT setup, although this time interval is exemplary only and may be greater or lesser in other embodiments. After TCON LUT setup is complete, eDP link training may be performed as shown. HPD timing may follow Video Electronics Standards Association (VESA) specifications.

It will understood that the particular combination of timing and actions of FIGS. 4 and 5 are exemplary only, and that other combinations of these or other timing and/or actions may be employed that are suitable for communicating information or signal/s corresponding to the proper DPCD profile or interface specification selection for use with a currently-selected GPU (e.g., iGPU 109 or dGPU 120) of a mobile information handling system to a TCON of an internal HDR display panel assembly, and for causing the TCON of the internal display panel assembly to respond to this communicated information or signal/s by selecting and loading a proper DPCD profile or interface definition that corresponds to the current internal dGPU of the mobile information handling system.

It will also be understood that one or more of the tasks, functions, or methodologies described herein (e.g., including those described herein for components 103, 105, 109, 120, 165, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:

communicating information or signal/s to a timing controller (TCON) of a display panel assembly of an information handling system, the information or signal/s indicating display port configuration data (DPCD) register values for use with a currently-selected graphics processing unit (GPU) of the information handling system;

responding to receipt of the information or signal/s in the TCON by selecting the indicated DPCD register values from multiple different DPCD register values stored on non-volatile memory (NVM) of the TCON;

loading the selected DPCD register values from the non-volatile memory of the TCON into volatile memory of the TCON; and using the loaded DPCD register values to control display of graphics from data provided by the currently-selected GPU of the information handling system on a display panel of the display panel assembly.

2. The method of claim 1, where the information handling system is a mobile information handling system comprising a chassis enclosure that contains the currently-selected GPU and the display panel assembly, the display panel assembly being a high definition resolution (HDR) display panel assembly that includes a HDR display panel.

3. The method of claim 1, where the indicated DPCD register values correspond to the currently-selected GPU of the information handling system and are stored on the NVM of the TCON with other different DPCD register values that correspond to one or more other GPUs that are different from the currently-selected GPU of the information handling system; and where the method further comprises responding to receipt of the information or signal/s in the TCON by identifying and selecting the indicated DPCD register values from among all the different DPCD register values stored on the NVM of the TCON.

4. The method of claim 1, where the DPCD register values stored on the NVM of the TCON comprise DPCD register values corresponding to a first GPU and different DPCD register values corresponding to a second and different GPU; and where the method comprises:

communicating the information or signal/s to the TCON of the display panel assembly of the information handling system as first information or signals when the currently-selected GPU is the first GPU, the first information or signal/s indicating DPCD register values for use with the first GPU;

communicating the information or signal/s to the TCON of the display panel assembly of the information handling system as second information or signals when the currently-selected GPU is the second GPU, the second information or signal/s indicating DPCD register values for use with the second GPU;

responding to receipt of the information or signal/s in the TCON by either:

selecting the indicated first DPCD register values from the NVM of the TCON when the information or signal/s are communicated as the first information or signal/s, or selecting the indicated second DPCD register values from the NVM of the TCON when the information or signal/s are communicated as the second information or signal/s;

then loading the selected first or second DPCD register values from the non-volatile memory of the TCON into volatile memory of the TCON; and then using the loaded first DPCD register values to control display of graphics from data provided by the currently-selected GPU of the information handling system on the display panel of the display panel assembly when the currently-selected GPU is the first GPU, and using the loaded second DPCD register values to control display of graphics from data provided by the currently-selected GPU of the information handling system on the display panel of the display panel assembly when the currently-selected GPU is the second GPU.

5. The method of claim 1, where the communicating comprises communicating graphics identification information (GII) from the currently-selected GPU of the information handling system to the TCON of the display panel assembly; and where the responding comprises responding to receipt of the GII in the TCON by selecting DPCD register values corresponding to the GII from the DPCD register values stored on the NVM of the TCON.

6. The method of claim 5, where the GII comprises an IEEE Organizationally Unique Identifier (OUI) for the currently-selected GPU.

7. The method of claim 1, where the communicating comprises communicating a signal from a separate programmable integrated circuit of the information handling system to the TCON of the display panel assembly, the separate programmable integrated circuit being different from any GPUs of the information handling system; and where the responding compromises responding to receipt of the signal in the TCON by selecting DPCD register values corresponding to the received signal from the DPCD register values stored on the NVM of the TCON.

8. The method of claim 7, where the separate programmable integrated circuit comprises an embedded controller (EC) of the information handling system; and where the signal comprises a general purpose input/output (GPIO) signal.

9. The method of claim 7, further comprising executing basic input/output system (BIOS) programming on the separate programmable integrated circuit to select a characteristic of the signal to correspond to the currently-selected GPU of the information handling system.

10. The method of claim 9, where the information handling system comprises a discrete GPU (dGPU) and an integrated GPU (iGPU) of a host programmable integrated circuit of the information handling system; and where the method further comprises selecting the currently-selected GPU to perform system graphics processing for driving the display panel of the display panel assembly between the dGPU and the iGPU of the information handling system; and then responding to a selection of either the dGPU or iGPU as the currently-selected GPU for graphics processing by executing the BIOS programming on the separate programmable integrated circuit to select the characteristic of the signal to correspond to the currently-selected dGPU or iGPU of the information handling system only when the corresponding dGPU or iGPU is selected as the currently-selected GPU for system graphics processing.

11. The method of claim 9, further comprising receiving from a human user a system input in the system BIOS that selects the currently-selected GPU for system graphics processing for driving the display panel of the display panel assembly; and then responding to the selection of the currently-selected GPU for graphics processing by executing the BIOS programming on the separate programmable integrated circuit to select the characteristic of the signal to correspond to the currently-selected GPU of the information handling system only when the currently-selected GPU is selected by the human user for system graphics processing.

12. An information handling system, comprising:

a display panel assembly comprising a display panel and a timing controller (TCON) comprising a first programmable integrated circuit that is coupled to control display of graphics on the display panel; and a graphics processing unit (GPU) coupled to provide graphics to the display panel assembly; and at least one second programmable integrated circuit of the information handling system programmed to communicate information or signal/s to the TCON indicating display port configuration data (DPCD) register values for use with the GPU when it is currently selected to perform system graphics processing for driving the display panel of the display panel assembly of the information handling system; and;

where the first programmable integrated circuit of the TCON is programmed to respond to receipt of the information or signal/s by:

selecting the indicated DPCD register values from multiple different DPCD register values stored on non-volatile memory (NVM) of the TCON, loading the selected DPCD register values from the non-volatile memory of the TCON into volatile memory of the TCON, and using the loaded DPCD register values to control display of graphics from data provided by the currently-selected GPU of the information handling system on the display panel of the display panel assembly.

13. The information handling system of claim 12, where the information handling system is a mobile information handling system comprising a chassis enclosure that contains the GPU and the display panel assembly, the display panel assembly being a high definition resolution (HDR) display panel assembly that includes a HDR display panel.

14. The information handling system of claim 12, where the indicated DPCD register values correspond to the currently-selected GPU of the information handling system and are stored on the NVM of the TCON with other different DPCD register values that correspond to one or more other GPUs that are different from the currently-selected GPU of the information handling system; and where the first programmable integrated circuit is further programmed to respond to receipt of the information or signal/s by identifying and selecting the indicated DPCD register values from among all the different DPCD register values stored on the NVM of the TCON.

15. The information handling system of claim 12, where the DPCD register values stored on the NVM of the TCON comprise DPCD register values corresponding to a first GPU and different DPCD register values corresponding to a second and different GPU; and where the second programmable integrated circuit is programmed to:

communicate the information or signal/s to the TCON of the display panel assembly as first information or signals when the currently-selected GPU is the first GPU, the first information or signal/s indicating DPCD register values for use with the first GPU, and communicate the information or signal/s to the TCON of the display panel assembly as second information or signals when the currently-selected GPU is the second GPU, the second information or signal/s indicating DPCD register values for use with the second GPU;

where the first programmable integrated circuit of the TCON is programmed to respond to receipt of the information or signal/s in the TCON by:

selecting only the indicated first DPCD register values from the NVM of the TCON when the information or signal/s are communicated as the first information or signal/s and selecting only the indicated second DPCD register values from the NVM of the TCON when the information or signal/s are communicated as the second information or signal/s, then loading the selected first or second DPCD register values from the non-volatile memory of the TCON into volatile memory of the TCON, and then using the loaded first DPCD register values to control display of graphics from data provided by the currently-selected GPU of the information handling system on the display panel of the display panel assembly when the currently-selected GPU is the first GPU and using the loaded second DPCD register values to control display of graphics from data provided by the currently-selected GPU of the information handling system on the display panel of the display panel assembly when the currently-selected GPU is the second GPU.

16. The information handling system of claim 12, where the GPU comprises the second programmable integrated circuit, the second programmable integrated circuit being programmed to communicate graphics identification information (GII) from the currently-selected GPU of the information handling system to the TCON of the display panel assembly; and where the first programmable integrated circuit is programmed to respond to receipt of the GII in the TCON by selecting DPCD register values corresponding to the GII from the DPCD register values stored on the NVM of the TCON.

17. The information handling system of claim 16, where the GII comprises an IEEE Organizationally Unique Identifier (OUI) for the currently-selected GPU.

18. The information handling system of claim 12, further comprising a third programmable integrated circuit coupled to provide signals to the first programmable integrated circuit of the TCON, the third programmable integrated circuit being different from the currently-selected GPU; where the third programmable integrated circuit is programmed to communicate a signal to the TCON of the display panel assembly; and where the second programmable integrated circuit of the TCON is programmed to respond to receipt of the signal by selecting DPCD register values corresponding to the received signal from the DPCD register values stored on the NVM of the TCON.

19. The information handling system of claim 18, where the third programmable integrated circuit comprises an embedded controller (EC) of the information handling system; and where the signal comprises a general purpose input/output (GPIO) signal.

20. The information handling system of claim 18, further comprising:

a host programmable integrated circuit;

a discrete GPU (dGPU) selectably providing graphics to the display panel assembly; and an integrated GPU (iGPU) of the host programmable integrated circuit selectably providing graphics to the display panel assembly;

where the third programmable integrated circuit is further programmed to select system graphics processing for driving the display panel of the display panel assembly between the dGPU and the iGPU of the information handling system, and to select the characteristic of the signal to correspond to the to the currently-selected dGPU or iGPU of the information handling system only when the corresponding dGPU or iGPU is selected as the currently-selected GPU for system graphics processing.

21. The information handling system of claim 18, where the third programmable integrated circuit is further programmed to: receive input from a human user in the system BIOS that selects the currently-selected GPU for system graphics processing for driving the display panel of the display panel assembly; and then respond to the selection of the currently-selected GPU for graphics processing by executing the BIOS programming on the first programmable integrated circuit to select the characteristic of the signal to correspond to the currently-selected GPU of the information handling system only when the currently-selected GPU is selected by the human user for system graphics processing.

* * * * *